(12) United States Patent
Arad et al.

(10) Patent No.: US 8,854,969 B2
(45) Date of Patent: Oct. 7, 2014

(54) METHOD AND SYSTEM FOR ADAPTIVE RESOURCE ALLOCATION

(75) Inventors: Seyed Mohammad Ali Arad, Richmond Hill (CA); Frank van Heeswyk, Toronto (CA)

(73) Assignee: Taqua WBH, LLC, Richardson, TX (US)

( * ) Notice: Subject to any disclaimer, the term of this patent is extended or adjusted under 35 U.S.C. 154(b) by 273 days.

(21) Appl. No.: 13/284,669

(22) Filed: Oct. 28, 2011

(65) Prior Publication Data

US 2012/0106341 A1 May 3, 2012

Related U.S. Application Data

(60) Provisional application No. 61/408,602, filed on Oct. 30, 2010.

(51) Int. Cl.
*H04L 12/26* (2006.01)
*H04W 16/04* (2009.01)
*H04W 72/04* (2009.01)

(52) U.S. Cl.
CPC .......... *H04W 16/04* (2013.01); *H04W 72/0446* (2013.01); *H04W 72/0486* (2013.01)
USPC ........................................................ 370/235

(58) Field of Classification Search
USPC .......................................... 370/235; 709/203
See application file for complete search history.

(56) References Cited

U.S. PATENT DOCUMENTS

| | | |
|---|---|---|
| 6,532,224 B1 | 3/2003 | Dailey |
| 2003/0103477 A1 | 6/2003 | Doi et al. |
| 2007/0230397 A1 | 10/2007 | Sakata |
| 2010/0150120 A1* | 6/2010 | Schlicht et al. ............... 370/338 |
| 2010/0268768 A1* | 10/2010 | Kurtenbach et al. .......... 709/203 |
| 2011/0179332 A1* | 7/2011 | Ryden et al. .................. 714/751 |

OTHER PUBLICATIONS

International Search Report and Written Opinion issued for PCT/US2011/058440, dated May 22, 2012, 8 pages.

* cited by examiner

*Primary Examiner* — Wei Zhao
(74) *Attorney, Agent, or Firm* — Fulbright & Jaworski LLP

(57) ABSTRACT

Methods and systems for adaptively allocating resources within a communication network, such as adaptive zone allocation in a wireless backhaul network.

35 Claims, 4 Drawing Sheets

| | | | DL grant size per remote | | | |
|---|---|---|---|---|---|---|
| | | Traffic activity scenario | 1 | 2 | 3 | 4 |
| Connected remotes | 1 | | 16 | | | |
| | 2 | All active | 8 | 8 | | |
| | | One a bit more active | 10 | 6 | | |
| | | One more active | 12 | 4 | | |
| | | One idle | 14 | 2 | | |
| | 3 | All active | 6 | 6 | 4 | |
| | | One more active | 8 | 4 | 4 | |
| | | One idle | 8 | 6 | 2 | |
| | | One idle, one more active | 10 | 4 | 2 | |
| | | Two idle | 12 | 2 | 2 | |
| | 4 | All active | 4 | 4 | 4 | 4 |
| | | One idle | 6 | 4 | 4 | 2 |
| | | Two idle | 6 | 6 | 2 | 2 |
| | | Two idle, one more active | 8 | 4 | 2 | 2 |
| | | Three idle | 10 | 2 | 2 | 2 |

|  |  | DL grant size per remote | | | |
|---|---|---|---|---|---|
|  | Traffic activity scenario | 1 | 2 | 3 | 4 |
| 1 |  | 16 |  |  |  |
| 2 | All active | 8 | 8 |  |  |
| | One a bit more active | 10 | 6 |  |  |
| | One more active | 12 | 4 |  |  |
| | One idle | 14 | 2 |  |  |
| 3 | All active | 6 | 6 | 4 |  |
| | One more active | 8 | 4 | 4 |  |
| | One idle | 8 | 6 | 2 |  |
| | One idle, one more active | 10 | 4 | 2 |  |
| | Two idle | 12 | 2 | 2 |  |
| 4 | All active | 4 | 4 | 4 | 4 |
| | One idle | 6 | 4 | 4 | 2 |
| | Two idle | 6 | 6 | 2 | 2 |
| | Two idle, one more active | 8 | 4 | 2 | 2 |
| | Three idle | 10 | 2 | 2 | 2 |

(Connected remotes — leftmost column)

Fig. 1

```
% Input parameters
Nsym = 16;       % number of available DL symbols
demand = [1,2,1,0];  % list of remotes' traffic demand - 2: high, 1: medium, 0:
Nr=length(demand);   % number of remotes % initialize round-robin (RR) pointers (point them to the first remote in the l:
p0=1;   % pointer of the equal demand RR loop
p1=1;   % pointer of the first loop in two-level RR method
p2=1;   % pointer of the second loop in two-level RR method while true   % DL allocation loop (every Ta frames)
    % initialize list of DL allocations
    dlzone = ones(1,Nr)*2;       % initial allocation of 2 symbols
    rsym = Nsym - sum(dlzone);   % remaining symbols if min(demand) == max(demand)    % equal demand case
        % run simple round robin
        while rsym>1
            j0=1;   % loop counter
            while j0<=Nr AND rsym>1
                % give 2 more symbols to the remote pointed by p0
                dlzone[p0] = dlzone[p0] + 2;
                rsym = rsym - 2;
                % move the pointer to next remote
                p0 = mod(p0,Nr)+1;
                j0 = j0+1;
            end
        end else    % unequal demand
        % run two-level round robin loops
        while rsym>1
            % first loop
            j1=1;   % loop counter
            while j1<=Nr AND rsym>1
                % give 2 more symbols for high traffic demand
                if demand[p1] == 2
                    dlzone[p1] = dlzone[p1] + 2;
                    rsym = rsym - 2;
                end
                % move the pointer to next remote
                p1 = mod(p1,Nr)+1;
                j1 = j1+1;
            end % second loop
            j2=1;   % loop counter
            while j2<=Nr AND rsym>1
                % give 2 more symbols for high and medium traffic demand
                if demand[p2] >= 1
                    dlzone[p2] = dlzone[p2] + 2;
                    rsym = rsym - 2;
                end
                % move the pointer to next remote
                p2 = mod(p2,Nr)+1;
                j2 = j2+1;
            end
        end
    end
end
```

Fig. 2

METHOD AND SYSTEM FOR ADAPTIVE RESOURCE ALLOCATION

RELATED APPLICATIONS

This application claims the benefit of U.S. Provisional Patent Application No. 61/408,602, filed Oct. 30, 2010 and entitled "Method and System for Adaptive Resource Allocation."

FIELD OF THE INVENTION

The present invention relates to implementation of a communication network, and more specifically to adaptive zone allocation within a communication network based on traffic demand.

BACKGROUND OF THE INVENTION

Communication between nodes in a communication network requires the allocation of resources for uplink and downlink traffic. As an example, traffic is transmitted and received between two nodes of a network. In one case, a center node, or hub, controls communication with one or more remote nodes, or remote stations, in the network.

For instance, the hub can use a time division duplex (TDD) frame structure for transferring information to and from the remote nodes. The frame is divided into downlink (DL) and uplink (UL) sub-frames. Portions of these sub-frames are further divided into zones or time sectors and are used to carry DL/UL traffic between two nodes in a communication network.

Allocation of these DL/UL zones is based on the number of connected remote nodes. More specifically, allocation of the zones is statically applied depending on the number of remote nodes. For instance, at each network entry or leave, available DL/UL resources are partitioned among the remote nodes equally to the extent possible. The zone allocation remains static as long as the number of connected remote nodes does not change, and only changes when a remote node joins or leaves the network connection to the center node.

However, the allocation of zone resources does not take into account traffic activity, such as the change in the volume of traffic encountered by the remote nodes. Node traffic will vary depending on various variables, including time of day, activity of a population, and type of community the network services. For instance, if a communication network including a controlling hub and one or more remote nodes services a business district there will be high demand throughout the middle of the day as persons work within the area, but less demand in the early morning and late evenings as persons leave the area. In addition, certain areas served by remote nodes may encounter an increase in demand for traffic during certain periods. As an example, persons may travel to various areas within the community to have lunch, thereby creating temporary increased in demand for traffic during those lunch hours. A static allocation of resources is unable to adequately handle an increase or decrease in demand from one remote node.

BRIEF DESCRIPTION OF THE DRAWINGS

Exemplary embodiments are illustrated in referenced figures of the drawings which illustrate what is regarded as the preferred embodiments presently contemplated. It is intended that the embodiments and figures disclosed herein are to be considered illustrative rather than limiting.

FIG. 1 is an example of adaptive zone allocation numerology using 16 symbols, in accordance with one embodiment of the present invention.

FIG. 2 is a flow diagram illustrating a method for adaptive resource allocation for a new frame event, in accordance with one embodiment of the present invention.

DETAILED DESCRIPTION

Figure 3:
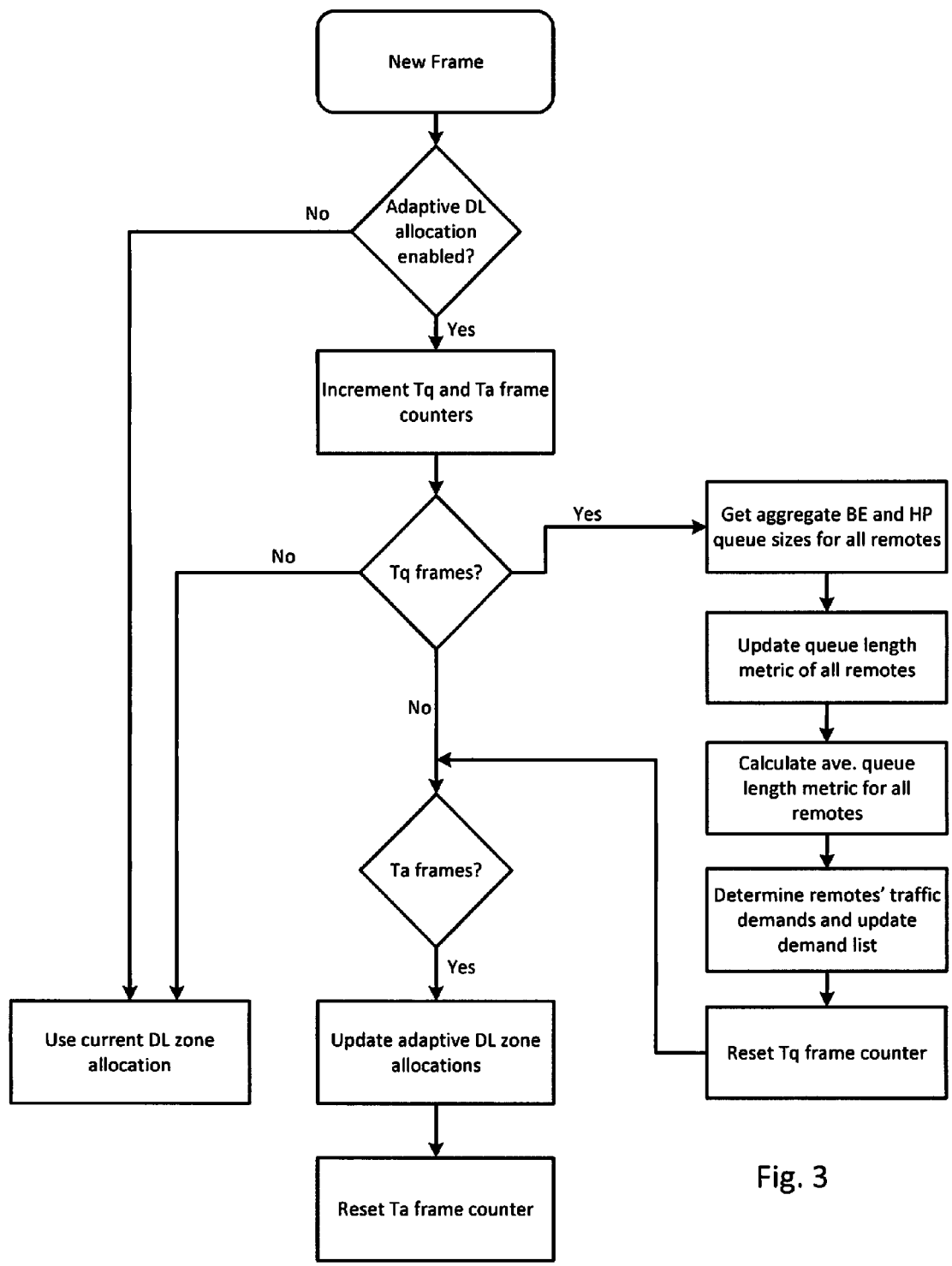
FIG. 3 is a flow diagram illustrating a method for adaptive resource allocation including actions that would take place for new frame events, in accordance with one embodiment of the present invention.

Reference will now be made in more detail to the preferred embodiments of the present invention, systems and methods for adaptive zone allocation based on traffic demand from one or more remote stations in a wireless backhaul network. While the invention will be described in conjunction with the preferred embodiments, it will be understood that they are not intended to limit the invention to these embodiments. On the contrary, the invention is intended to cover alternatives, modifications and equivalents which may be included within the spirit and scope of the invention.

Accordingly, embodiments of the present invention provide for adaptive resource allocation within a wireless backhaul network. Other embodiments provide the above advantage and also provides for adaptive zone allocation for downlink traffic in a wireless backhaul network.

While embodiments of the present invention are described as providing adaptive zone allocation within a wireless backhaul network, other embodiments are well suited to providing adaptive resource allocation for any type of communication network, wireless or wired, and/or between nodes of any communication network.

Notation and Nomenclature

Embodiments of the present invention can be implemented on a software program for processing data through a computer system. The computer system can be a personal computer, notebook computer, server computer, mainframe, networked computer (e.g., router), handheld computer, personal digital assistant, workstation, and the like. Other embodiments may be implemented through specialized hardware for purposes of implementing adaptive zone allocation within a communication network, such as a wireless backhaul network. This program or its corresponding hardware implementation is operable for enabling the integration of one or more applications supporting the completion or implementation of a work flow process. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining," "creating," "storing," or the like refer to the actions and processes of a computer system, or similar electronic computing device, including an embedded system, that manipulates and transfers data represented as physical (electronic) quantities within the computer system's registers and memories into other data similarly represented as physical quantities within the computer system memories or registers or other such information storage, transmission or display devices.

Further, throughout the Application, the term "database" is used to describe a location for storing information or data, and/or a mechanism for storing information or data. As such, "database" is interchangeable with the following terms: storage, data store, etc.

Exemplary Implementation of Backhaul Scheduling

Some communication systems use a time division duplex (TDD) frame structure. The frame can be divided into downlink (DL) and uplink (UL) sub-frames. The DL sub-frame starts with one preamble symbol, followed by two symbols used for DL/UL MAP. The UL sub-frame also starts with three symbols used for UL ranging. The remaining parts of these sub-frames are used to carry DL/UL traffic to/from connected remote stations. They are divided into a number of time sectors or "zones", where each zone is allocated to one remote station. Each zone spans a number of symbols in time domain and all sub-channels in frequency domain. A symbol can be defined as the smallest increment of time allocation in the TDD frame structure or protocol.

In one implementation, both the DL and UL sub-frames use partial usage subchannelization (PUSC) permutation. As a result, the minimum unit of allocation in time domain for both sub-frames (referred to as "slot") is two symbols. While embodiments of the present invention are described using a minimum unit of allocation of two symbols, other embodiments of the present invention are well suited to requiring no minimum units of allocation in the time domain for sub-frames.

Backhaul scheduling involves a combination of inter-zone and intra-zone scheduling. For inter-zone scheduling, each connected remote station is assigned a zone in DL and UL sub-frames. The size of the zones in time domain depends on the system configuration (e.g., frame duration and DL/UL TDD split) and the number of connected remotes.

For intra-zone scheduling, within each zone, the scheduler goes through the list of service flows associated with its corresponding remote station and tries to schedule their packets according to their Quality of Service (QoS) requirements, in one implementation.

As part of the intra-zone scheduling, the scheduler divides each zone into a number of bursts (currently only two bursts are configured; one for management and one for data). Each burst spans one or more sub-channels in frequency domain and all symbols of the zone in time domain. The management bursts can be used for backhaul control channels and carry management messages in DL and feedback control messages in UL.

As previously described, static allocation of DL/UL zones through a backhaul network is based on the number of connected remote stations. Upon each network entry or leave of a remote station, available DL/UL radio resources are equally partitioned among the connected remote stations. That is, the hub station tries to give remotes equal portions of DL/UL symbols, to the extent that is possible given even number of symbols in each PUSC zone. As such, the zone allocation remains static as long as the number of connected remote stations does not change.

For purposes of illustration, zone allocation may be performed by a mapping function. The mapping function is called each time a frame zone structure needs to be altered. In one implementation these occasions happen when a remote station joins or leaves the hub station. The mapping function can use a DL or UL table to determine the number of DL/UL symbols allocated for each remote station. These tables can be look-up tables that contain two dimensional arrays representing the number of connected remote stations and the granting of symbols for each remote station.

Adaptive Zone Allocation in a Backhaul Network

As previously mentioned static zone allocations are changed only on network entry and leave of a remote station, and also gives remote stations equal portions of radio resources independent of their traffic activity. On the other hand, embodiments of the present invention provide for a dynamic resource allocation process that takes the traffic demands at each of the remote stations into consideration and adapts allocated radio resources to the traffic activity of remote stations.

Accordingly, embodiments of the present invention provide for an adaptive zone allocation algorithm that monitors remote stations traffic activity on a periodic basis and dynamically adjusts zone sizes based on the traffic demand at the remote stations. In particular, inter-zone scheduling is performed based on a new adaptive solution that changes zone allocations much more frequently than the previously described static implementation of zone allocation.

While embodiments of the present invention provide for zone allocation in a frame structure that is divided between inter-zone and intra-zone scheduling, other embodiments are well suited to a dynamic scheduling solution that uses the whole DL/UL sub-frames to serve data traffic from remote stations, with no zone partitioning and no minimum allocation. Application of the principles outlined in this application are well suited to the above dynamic scheduling solution.

For purposes of illustration only, embodiments of the system and method for adaptive zone allocation in a wireless backhaul network described herein include the size of each DL/UL zone as being an even number of symbols, with a minimum of two. Of course, in other embodiments, the size of the DL/UL zone can be an even or odd number of symbols and may also be zero.

FIG. 1 shows the DL zone allocation numerology with 16 data symbols in DL sub-frame. In one implementation, it is assumed in this table that remote stations are sorted based on their DL traffic activity in descending order and numbered accordingly. So, in each traffic activity scenario (each row of the table), remote station 1 would be the most active remote in DL direction, remote station 2 is the second most active one, and so on. Following the above example, the number of allocation choices as shown in FIG. 1 (e.g., with 16 DL symbols) is limited to five choices for any given number of connected remote stations.

Embodiments of the present invention are described within the context of providing adaptive zone allocation in the DL direction (e.g., allocation of DL sub-frames); however, other embodiments are well suited to providing adaptive zone allocation in the UL direction (e.g., allocation of UL sub-frames), depending on requirements.

In one embodiment, traffic demand of remote stations is monitored. For instance, the average DL traffic demand of connected remote stations is tracked or monitored. This can be done, for instance, by monitoring the DL queue size of best effort (BE) traffic and keeping track of committed rate (CIR) of higher priority (HP) traffic. The averaging shall be done on a periodic basis with a configurable period.

For instance, traffic is monitored using DL traffic queue size as the indicator of the DL traffic demand. If the size of the DL traffic queue for a particular remote station starts growing over time, it indicates that the DL traffic demand of that remote unit is higher than its current DL bandwidth allocation.

In one implementation, for each remote station, the scheduler maintains separate queues for DL flows in different QoS classes. To get an estimate of overall DL traffic demand for a remote node, the feature will determine a queue length metric using DL queue sizes over various QoS classes. In one application, HP flows are given a higher weight over lesser priority flows, such as BE traffic. As such, in one implementation the queue length metric for each remote unit is calculated as, in Equation 1, as follows:

$$L_i = (w_{HP})(L_{HP\text{-}aggregate}) + L_{BE\text{-}aggregate} \quad (1)$$

where $L_{HP\text{-}aggregate}$ and $L_{BE\text{-}aggregate}$ are the aggregate queue sizes over all DL HP and BE queues for remote node i, respectively, and $w_{HP}$ is an integer representing the weight given to the higher priority (HP) traffic relative to BE traffic.

In addition, DL queue sizes are sampled periodically with a period of $T_q$ frames. The average queue length metric is then calculated using the sampled queue sizes, as follows in Equation 2:

$$\overline{L}_i(k) = \alpha \cdot L_i(k) + (1-\alpha) \cdot \overline{L}_i(k-1) \quad (2)$$

where:
$L_i(k)$ is the queue length metric for remote unit i at k-th queue size sampling instance,
$\overline{L}_i(k)$ is the average queue length metric for remote unit i at k-th queue size sampling instance, and
$\alpha$ is a configurable parameter that ranges between zero and one.

The sampling time of the DL queue length metric ($T_q$ frames) will be much shorter than the period of the adaptive allocation algorithm, in one implementation. This allows a number of queue size samples to be collected during each period of adaptive allocation. The average queue length metric in this case represents the short-term average traffic demand of a remote node.

After measuring the average DL queue length metric for each remote node, these values can be mapped to three levels of DL traffic demand: low, medium and high. The mapping is done using two configurable thresholds on the average queue length metric: $L_{low}$ and $L_{high}$, with $L_{low} \leq L_{high}$. For each remote unit i, the DL traffic demand is determined, as follows:

Low traffic demand: if $\overline{L}_i < L_{low}$.

Medium traffic demand: if: $L_{low} \leq \overline{L}_i \leq L_{high}$; and

High traffic demand: if $\overline{L}_i > L_{high}$.

In another embodiment, DL symbols are reallocated among connected remote stations according to their average DL traffic demand of remote nodes for purposes of adaptive zone allocation. The zone reallocation is done on a periodic basis with a configurable period of $T_a$. In one embodiment, the following process is performed for adaptive zone allocation.

1. If there is only one remote node in the system, it gets all DL symbols and the process ends.
2. Assigning minimum allocation to remote nodes. The initial size of each DL zone is set to 2 symbols.
3. If there is more than one remaining DL symbols after minimum allocation, the process continues with adaptive allocation. Otherwise, it ends at this step.
4. Adaptive allocation of remaining symbols based on traffic demand. Depending on the current levels of DL traffic demand, one of the following can happen:
    a. If all connected remote units have the same level of DL traffic demand, the remaining symbols are assigned using a simple round-robin method. In each round, each remote node is assigned 2 additional DL symbols. This process continues until all available DL symbols are assigned.
    b. If remote nodes have different levels of DL traffic demand, a two-level round-robin method is used to assign remaining symbols.
        i. First, each remote node with high traffic demand gets 2 additional DL symbols.
        ii. Then, each remote unit with high or medium traffic demand gets 2 more DL symbols.
        iii. The above steps are repeated until all DL symbols are assigned.

For example, the two-level round-robin method described in step 4(b) above is equivalent to a weighted round-robin resource allocation method with weights of 2 and 1 for high and medium traffic demands.

In addition, each of the round-robin loops mentioned above can have its own pointer that points to the remote unit that will be served next in the loop. For instance, one pointer can be used in the round-robin loop of step 4(a), and two pointers can be used in the two round-robin loops of step 4(b). In one implementation the current values of these pointers are maintained at the end of each allocation process when all symbols are allocated. Thus, in the next instance of adaptive zone allocation, each round-robin loop starts its allocation at the remote unit pointed by its own pointer (that is carried forward from the previous instance of running the loop).

For the two-level round-robin method mentioned in step 4(b), each allocation instance starts with the first loop (the one in step (i)). Therefore, even if an allocation process ends in the middle of the second loop, the next instance of symbol allocation starts with the first loop at the remote unit indicated by the first loop pointer. This can ensure higher allocation for the remote stations with high traffic demand.

FIG. 2 shows an exemplary pseudocode for the adaptive zone allocation algorithm, in one embodiment. As input, it takes the number of DL symbols, the number of connected remote units, and the list of traffic demands of remotes. In one implementation traffic demands of low, medium and high are mapped to 0, 1, and 2, respectively. The current settings of input parameters in this code are just shown as an example. One assumption is that these parameters are updated based on the current state of the system.

The mod( ) function in FIG. 2 is the modulus function. In this case, it can be implemented as:

$$\text{mod}(p, N) = p \text{ if } p < N$$
$$= 0 \text{ otherwise}$$

The "ones(1,N)" function in this code creates a vector of length N with all elements set to one. It is used for the initial setting of the DL allocation vector, in one implementation. The "sum( )" function returns the sum of elements of the vector, while "min( )" and "max( )" return the minimum and maximum values of elements of the vector.

The output of this algorithm is the list of DL zone allocations stored in "dlzone." As an example, for the input setting mentioned in this code (e.g., 16 symbols and 4 remotes with traffic demand of [1, 2, 1, 0]), the zone allocation vector would be equal to [4, 6, 4, 2] symbols in every DL allocation instance as long as the traffic demand scenario remains unchanged. If the traffic demand scenario changes to [2, 2, 1, 0] (i.e., if first remote node is marked as high traffic demand), the allocation vector is updated to the following sequences of values during the next three DL allocation instances:

[6, 6, 2, 2];

[6, 4, 4, 2]; and

[4, 6, 4, 2].

This pattern would then be repeated while the traffic demand condition remains the same.

In the event the fourth remote node leaves the system and the traffic scenario for the remaining remote nodes remains unchanged, the new input vector would change to [2, 2, 1]. The DL allocation in this case changes to [6, 6, 4] symbols for the remaining three remote nodes and remains the same as long as the traffic demand has not changed.

FIG. 3 shows the flowchart of actions that would take place on every new frame with regard to zone allocation, in accordance with one embodiment of the present invention. These actions include periodic monitoring of traffic demands and periodic update of DL zone allocations. The block labeled as "Update adaptive DL zone allocations" performs the adaptive allocation algorithm described in FIG. 2.

In still another embodiment, adaptive zone reallocation is performed on network entry and leave. For example, a DL zone is allocated to a remote station on its network entry and readjusts the DL allocation of existing remotes, in one embodiment. When a remote station leaves the system, its DL resources are released and allocated to existing remote stations.

In particular, a DL zone is allocated to a remote station on its network entry, and readjusts the DL allocation of existing remotes. In the absence of a DL traffic demand estimate for the new remote station, the feature assumes medium DL traffic demand at entry time for the new remote node, in one implementation. It then performs the zone allocation process described above at the remote node entry time to determine its initial zone allocation. The remote unit is then added to the list of connected remote stations and the feature starts monitoring its DL traffic demand. In one implementation, the initial value for the new remote node is set to zero.

When a remote station leaves the system, the DL symbols previously allocated to that remote station are released. Those released DL symbols are then allocated to existing remote stations. This is done by removing the remote node from the list of connected remote stations and rerunning the DL zone allocation process as described above.

The DL zone reallocation at remote node entry and leave described above does not impact the periodic DL zone allocation process, in one embodiment. The adaptive algorithm continues its periodic operation and its timing is not impacted as remote nodes enter or leave the system. This means that the DL allocation process happens both on a periodic basis and on remote nodes entry and leave, and the same algorithm is performed in both events.

Figure 4:
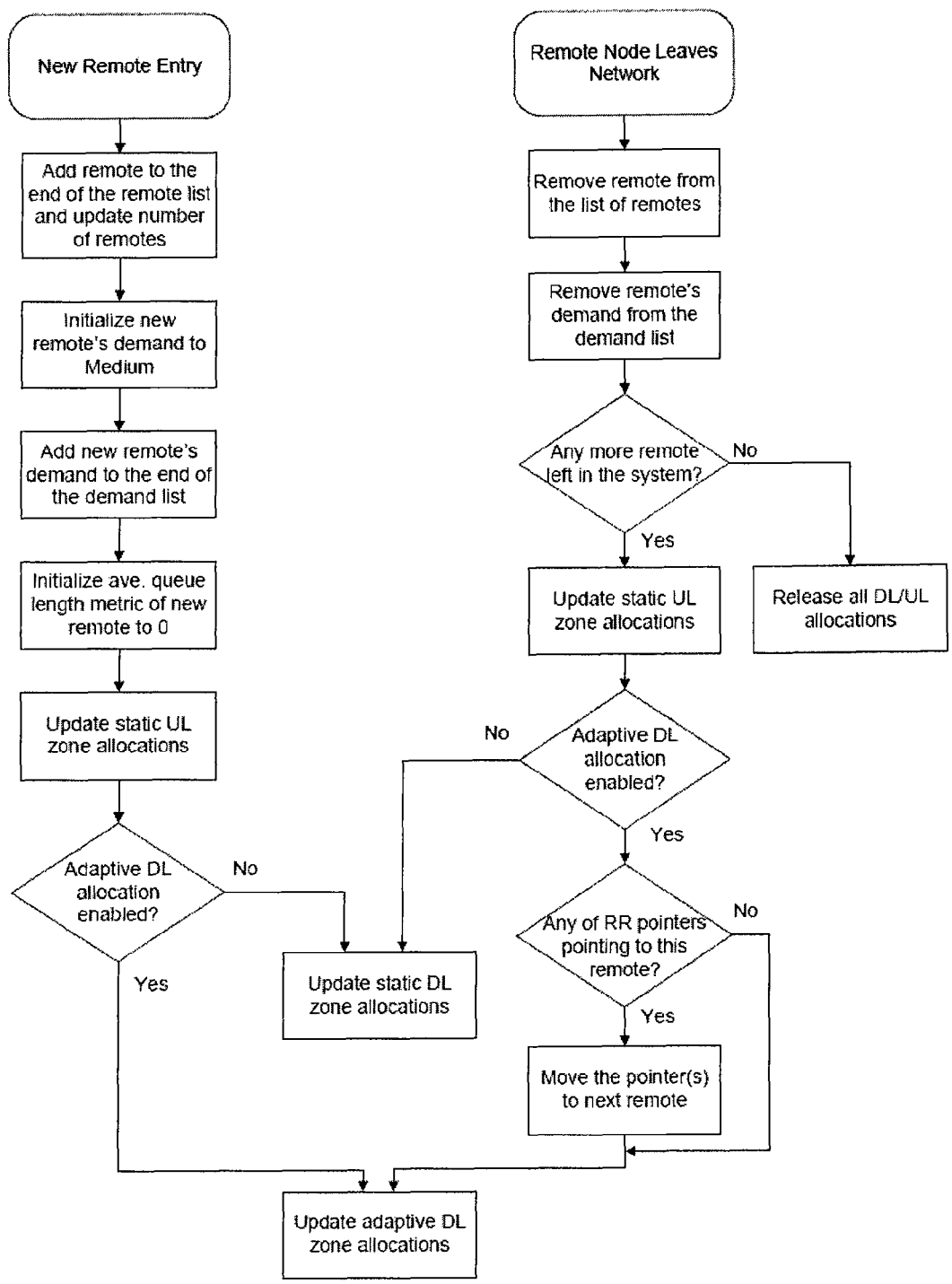
FIG. 4 is a flow diagram illustrating a method for adaptive resource allocation including actions that would take place for remote node entry and leave events, in accordance with one embodiment of the present invention.

FIG. 4 shows the flowchart of actions that would take place in the remote node entry and leave events, in accordance with one embodiment of the present invention. If adaptive allocation is enabled and any remote unit(s) is left in the system after these events, the adaptive DL zone allocation algorithm described in FIG. 2 is performed in the last step.

As described above, the adaptive allocation capabilities can be applied during inter-zone scheduling to adapt the size of DL zones to traffic demand. In other embodiments the adaptive allocation capabilities can also be turned on or off, depending on local requirements. For instance, it may be necessary to disable adaptive allocation capabilities during testing.

When adaptive allocation is turned off, static allocation of resources may be implemented, as previously described, in one embodiment. That is, allocation is performed statically with almost equal portions per remote nodes. Also, DL traffic demands are not monitored. In addition, the periodic DL zone allocation process is disabled. As a result, the DL allocation will be done only on network entry and leave using a DL look-up table, for example.

On the other hand, when adaptive allocation is turned on, DL symbols are reallocated using the adaptive allocation solution of various embodiments of the present invention. For instance, the initial allocation in this case may be based on medium traffic demand assumption for all remote stations. At the same time, the feature starts monitoring DL traffic demand of remote nodes and initiates the periodic DL reallocation process. In other implementations, the initial value for the all connected remote units may be set to zero in accordance with a low traffic demand assumption for all remote stations.

In still another embodiment, air interface quality-of-service (QoS) supports two QoS classes for each remote station. For instance, one class could be best effort, and another is a higher priority class (e.g., a generalized second class). For traffic given higher priority, the main QoS requirement is the committed information rate (CIR). The DL resource allocation should provide higher priority for higher priority flows over BE traffic, in one embodiment. Otherwise, remote units with high amount of higher priority traffic will be treated in the same way as remote nodes with high BE traffic demand, and could end up with similar or lower DL allocation than remote stations with BE traffic.

The higher priority traffic is supported both at inter-zone allocation and intra-zone scheduling levels, in one embodiment. As an example, for each remote station, separate queues are used for different QoS classes. Within each zone, the scheduler first allocates bandwidth to the higher priority flows according to their CIR requirements. Then, the remaining bandwidth is used to serve packets from BE flows as well as higher priority class flows having traffic demand above their CIRs. As such, the adaptive zone allocation supports higher priorities for different classes of traffic.

Table 1 lists configuration parameters used by one implementation of the adaptive resource allocation solution, such as within a wireless backhaul network, in accordance with one embodiment of the present invention. In one implementation, these parameters are configured through a command line interface (CLI) of a corresponding system. These CLIs allow the setting of parameters in run time, as well as performing a reading of values.

TABLE 1

Configuration parameters used by adaptive resource allocation feature

| Parameter | Description | Type | Configurability |
|---|---|---|---|
| Enable adaptive allocation | For turning on/off the adaptive DL zone allocation | Boolean | Run time |
| $T_q$ | Time period for sampling queue sizes and updating average queue length metrics (in frames) | Integer | Run time |
| $W_{HP}$ | Weight of HP queue size, relative to that of BE | Integer | Run time |
| $\propto$ | Constant used in calculating the average queue length metric, ranging between 0 and 1 | Floating point | Run time |
| $L_{low}$ | Low threshold on average queue length metric (in bytes) | Integer | Run time |
| $L_{high}$ | High threshold on average queue length metric (in bytes) | Integer | Run time |
| $T_a$ | Time period for adaptive DL zone reallocation (in frames) | Integer | Run time |

A system and method for adaptive resource allocation within a communication network, such as adaptive zone allocation in a wireless backhaul network, is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The one or more present inventions, in various embodiments, include components, methods, processes, systems and/or apparatus substantially as depicted and described herein, including various embodiments, subcombinations, and subsets thereof. Those of skill in the art will understand how to make and use the present invention after understanding the present disclosure.

The present invention, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a central communication station configured to communicate with a plurality of remote communication stations and to communicate with one or more systems outside of a network including said central communication station and said plurality of remote communication stations, wherein said central communication station is configured to use an adaptive resource allocation protocol to allocate zones of time frames to remote communication stations of said plurality of remote communication stations in accordance with both communication traffic demand of said remote communication stations and a preselected standard of service, wherein said time frames are used for communications between said central communication station and said plurality of remote communication stations, and wherein a first remote communication station of said plurality of remote communication stations communicates with said central communication station during zones of said time frames allocated to the first remote communication station using said adaptive resource allocation protocol.

2. The system of claim 1, wherein said adaptive resource allocation protocol provides for allocating a zone of said time frames having at least a minimum size to each remote communication station of said plurality of remote communication stations and allocating remaining zones of said time frames to provide an increased size zone to particular remote communication stations of said plurality of remote communication stations in accordance with current levels of communication traffic demand of the respective remote communication stations.

3. The system of claim 2, wherein said current levels of communication traffic demand comprise current levels of download traffic demand.

4. The system of claim 2, wherein said minimum size of said zones comprises one or more symbols.

5. The system of claim 4, wherein said minimum size of said zones comprises two symbols.

6. The system of claim 1, wherein said frames have an upload subframe and a download subframe, and wherein said zones allocated to said first remote communication station in accordance with said adaptive resource allocation protocol include a zone in said upload subframe and a zone in said download subframe.

7. The system of claim 1, wherein said central communication station comprises a hub of a wireless backhaul network providing backhaul communication between said plurality of remote communication stations and said one or more systems outside of the network including said central communication station and said plurality of remote communication stations.

8. The system of claim 1, wherein said preselected standard of service comprises a standard volume of station communications between said central communications station and a remote communications station, and wherein said allocation of zones in accordance with said communication traffic demand provides an increase in a size of a particular zone allocated to a particular remote communication station in proportion to a difference of demand above said standard of service.

9. The system of claim 1, wherein said allocation of zones in accordance with communication traffic demand provides an increase in a size of a particular zone allocated to a particular remote communication station based at least in part on a priority of said communication traffic demand associated with said particular remote communication station.

10. The system of claim 9, wherein said priority comprises a quality of service class.

11. The system of claim 9, wherein said allocation of zones in accordance with communication traffic demand provides an increase in a size of said particular zone allocated to said particular remote communication station based at least in part on a size of said communication traffic demand associated with said particular remote communication station.

12. The system of claim 11, wherein said priority of said communication traffic demand is weighted more heavily than said size of said communication traffic demand in providing said increase in said size of said particular zone allocated to said particular remote communication station.

13. A system comprising:
a first remote communication station of a plurality of remote communication stations configured to communicate with a central communication station for communicating with one or more systems outside of a network including said central communication station and said plurality of remote communication stations, wherein said first remote communication station is configured to communicate with said central communication station using an adaptive resource allocation protocol configured to allocate zones of time frames to remote communication stations of said plurality of remote communication stations in accordance with both communication traffic demand of said remote communication stations and a preselected standard of service, and wherein said first remote communication station communicates with said central communication station during zones of said time frames allocated to the first remote communication station using said adaptive resource allocation protocol.

14. The system of claim 13, wherein said adaptive resource allocation protocol provides for allocating a zone of said time frames having at least a minimum size to each remote communication station of said plurality of remote communication stations and allocating remaining zones of said time frames to provide an increased size zone to remote communication stations of said plurality of remote communication stations in accordance with current levels of communication traffic demand of the respective remote communication stations.

15. The system of claim 14, wherein said current levels of communication traffic demand comprise current levels of download traffic demand.

16. The system of claim 14, wherein said minimum size of said zones comprises one or more symbols.

17. The system of claim 16, wherein said minimum size of said zones comprises two symbols.

18. The system of claim 13, wherein said time frames have an upload subframe and a download subframe, and wherein said zones allocated to said first remote communication station using said adaptive resource allocation protocol include a zone in said upload subframe and a zone in said download subframe.

19. The system of claim 13, wherein said network including said central communication station and said plurality of remote communication stations comprises a wireless backhaul network.

20. The system of claim 13, wherein said preselected standard of service comprises a standard volume of station communications between said central communication station and a remote communications station, and wherein said allocation of zones in accordance with communication traffic demand provides an increase in a size of said zones allocated to said first remote communication station in proportion to a difference of demand above said standard of service.

21. The system of claim 13, wherein said allocation of said zones in accordance with communication traffic demand provides an increase in a size of said zones allocated to said first remote communication station based at least in part on a priority of said communication traffic demand associated with said first remote communication station.

22. The system of claim 21, wherein said priority comprises a quality of service class.

23. The system of claim 21, wherein said allocation of zones in accordance with communication traffic demand provides an increase in a size of said zones allocated to said first remote communication station based at least in part on a size of said communication traffic demand associated with said first remote communication station.

24. The system of claim 23, wherein said priority of said communication traffic demand is weighted more heavily than said size of said communication traffic demand in providing said increase in said size of said zones allocated to said first remote communication station.

25. An adaptive resource allocation method comprising:
allocating, in communications between a central communication station and a plurality of remote communication stations using time frames, a zone of said time frames having at least a minimum size to each remote communication station of said plurality of remote communication stations; and
allocating, in said communications between said central communication station and said plurality of remote communication stations using said time frames, remaining zones of said time frames to provide an increased size zone to one or more remote communication stations of said plurality of remote communication stations in accordance with current levels of communication traffic demand of the respective remote communication stations.

26. The method of claim 25, wherein said allocating said zone of said time frames having at least a minimum size to each remote communication station allocates zones of time frames to remote communication stations in accordance with a preselected standard of service, and wherein said allocating said remaining zones of said time frames to provide said increased size zone to said remote communication stations allocates zones of time frames to remote communication stations in accordance with communication traffic demand of said remote communication stations.

27. The method of claim 25, wherein said allocating said remaining zones of said time frames to provide said increased size zone to said remote communication stations provides an increase in a size of said zone allocated to a particular remote communication station based at least in part on a priority of said communication traffic demand associated with said particular remote communication station.

28. The method of claim 27, wherein said priority comprises a quality of service class.

29. The method of claim 27, wherein said allocating said remaining zones of said time frames to provide said increased size zone to said remote communication stations provides an increase in a size of said zone allocated to said particular remote communication station based at least in part on a size of said communication traffic demand associated with said particular remote communication station.

30. The method of claim 29, wherein said priority of said communication traffic demand is weighted more heavily than said size of said communication traffic demand in providing said increase in said size of said zone allocated to said particular remote communication station.

31. The method of claim 25, further comprising:
   monitoring communication traffic activity of said plurality of remote communication stations on a periodic basis, wherein said allocating remaining zones of said time frames is based upon said monitored communication traffic activity.

32. The method of claim 31, wherein said monitoring communication traffic activity comprises:
   monitoring download traffic queue size for said plurality of remote communication stations.

33. The method of claim 32, wherein said monitoring download traffic queue size comprises:
   determining a queue length metric using download queue sizes over various quality of service classes.

34. The method of claim 31, further comprising:
   mapping said monitored traffic activity of said plurality of remote communication stations to 3 levels of download traffic demand, said 3 levels of download traffic demand consisting of low, medium, and high.

35. The method of claim 25, wherein said allocating remaining zones of said time frames comprises:
   if all said remote communication stations of said plurality of remote communication stations having communication traffic demand have a same level of download traffic demand, implementing a round-robin assignment protocol to allocate said remaining zones of said time frames to each remote communication station of said plurality of remote communication stations having communication traffic demand; and
   if remote communication stations of said plurality of remote communication stations having communication traffic demand have a different level of download traffic demand, implementing a two-level round-robin assignment protocol to allocate said remaining zones of said time frames first to each remote communication station with high traffic demand and then to each remote unit with high or medium traffic demand.

* * * * *